United States Patent
Gull et al.

[15] 3,687,483
[45] Aug. 29, 1972

[54] ARRANGEMENTS FOR SENSING AND CORRECTING THE LEVEL OF A BODY

[72] Inventors: Karl-Heinz Gull, Bruehl-Vochem; Bernd-Dieter Marke, Finnentrop, both of Germany

[73] Assignee: Hoesch Aktiengesellschaft, Dortmund, Germany

[22] Filed: Nov. 4, 1970

[21] Appl. No.: 86,881

[30] Foreign Application Priority Data

Nov. 5, 1969 Germany .......... 19 55 597.6

[52] U.S. Cl. .............................. 280/124 F, 267/65 D
[51] Int. Cl. .............................................. B60g 17/04
[58] Field of Search .......... 280/124 F, 6 H; 267/65 D; 137/392, 412

[56] References Cited

UNITED STATES PATENTS

| | | | |
|---|---|---|---|
| 3,603,612 | 9/1971 | Hill | 267/65 D |
| 3,036,844 | 5/1962 | Vogel | 280/124 F |
| 2,976,054 | 3/1961 | Sahagian | 280/124 F |

*Primary Examiner*—Philip Goodman
*Attorney*—Michael S. Striker

[57] ABSTRACT

A level sensor, comprising a magnetically influenced field plate or a magnetically operated switch, is built into the shock absorber to control the flow of hydraulic fluid to, or withdrawal of hydraulic fluid from, a shock absorber. A circuit connected to the sensor output compares the signals to control flow through the hydraulic lines.

25 Claims, 8 Drawing Figures

INVENTOR
KARL-HEINZ GULL
BERND-DIETER MARKE

INVENTOR
KARL-HEINZ GULL
BERND-DIETER MARKE

INVENTOR
KARL-HEINZ GULL
BERND-DIETER MARKE

ARRANGEMENTS FOR SENSING AND CORRECTING THE LEVEL OF A BODY

BACKGROUND OF THE INVENTION

The invention relates to an arrangement for sensing the height of a vehicle body with respect to the wheel axle. The invention also relates to circuits for processing signals from a height sensor, and to the combination of the sensor and the circuit.

German Pat. No. 12 59 212 discloses a circuit for electrically controlling the level of gas springs intended for motor vehicles. A valve is operated in dependence on the motion of the piston in the cylinder, the operation of the valve being delayed by a time delay unit. The valve controls the supply and withdrawal of hydraulic fluid for the gas spring to obtain the desired level.

The control signals are induced in a differential transformer composed of a coil fixed to the piston and to two coils fixed to the cylinder. The opposed alternating voltages from the differential transformer are rectified; and the sign of the different voltage at the summation junction, composed of the tap of a potentiometer, determines whether the vehicle body is to be raised or lowered. The desired body level is set by the continuously movable tap of the potentiometer.

The central coil of the differential transformer is fed an alternating voltage, which is obtained from an alternating current generator. Since the voltage induced in a coil is proportional to the number of turns, the ratio between the voltages across the primary and secondary coils is the same as the turns ratio. This ratio is expressed mathematically $E_2 : E_1 = T_2 : T_1$. Since the frequency $f$ is proportional to the rpm $r$, the level regulator is rpm dependent.

The central coil of the differential transformer can also be supplied with an alternating voltage from a transistor alternating current generator that is fed direct current. Inasmuch as the load is not constant, a constant voltage source must be provided. These sources for alternating current are designed so that the voltage supplied is regulated in dependence on the alternating voltage output. The frequency must be held constant. The polarized relay connected to the output of the circuit is incapable of switching the inductive load, so that two additional relays are necessary.

Consequently, a relatively elaborate circuit is required of which the differential transformer is the most expensive component. A further disadvantage of the circuit is that electric leads must be connected to moving parts.

German Pat. No. 12 55 514 describes a level regulator for the air springs of a motor vehicle, the regulator having at least one switch positioned between the wheel axle and the frame. The switch controls the current to a magnet winding for respective valves in each of the feed and exhaust lines of the air springs. A time delay circuit, composed of a transistor, capacitor, and a load resistor, is connected to each magnet winding.

Each of the two transistors connected in series with the magnet winding of the respective supply valve and exhaust valve has its emitter connected to one pole of the current source. The base is connected by a resistor to one of two free contacts of a switch connected to the other pole of the source. The aforesaid time delay capacitor connects the transistor base with the other of the two contacts, each of these contacts being connected by a respective resistor to the emitters of the transistors. As shown in FIG. 2 of the patent, the sensor requires a heavy duty switch, which causes interference voltages. Moreover, large components, such as contact surfaces, are necessary. In addition, the time constant varies greatly because of temperature changes or hysteresis of the first relay.

The German Patent laid open to public inspection 12 83 104 describes an arrangement for preventing chance variations in the height of a single wheel from causing an adjustment of the level when the level regulator has previously been set into operation by these variations. The arrangement comprises several height sensors so connected in series that a signal is provided only when all of the sensors are in the same switching position. The operation of such a level regulator is dependent on the condition that at least two wheels are too high or too low, so that the regulator is set into operation.

Since each side of the vehicle is separately regulated, with a view to obtaining lateral stability, the number of pumps, compressors and so forth must be doubled. Moreover, the large switching currents give rise to high frequency interference, which must be attenuated by filters, which represent an additional expense.

SUMMARY OF THE INVENTION

An object of the invention is means for sensing the height of a vehicle body above the wheel axle, which means avoid the aforesaid disadvantages of the prior art.

An other object of the invention is sensing means of the aforesaid kind, which is inactive while the vehicle rounds a curve, and which quickly adjusts changes in height including tipping of the body caused by uneven loading.

Another object of the invention is circuits for processing signals from a height sensor.

A still further object of the invention is the combination of the sensors and circuits of the invention. The height sensor of the invention consists essentially of a cylinder element, a piston element movable within the cylinder element, one of these elements secured to the wheel axle and the other of these elements secured to the body of the vehicle, magnet means for producing a steady magnetic field arranged within the cylinder element, and sensor means arranged also within the cylinder element spaced from the magnet means, one of the means mounted for movement in dependence upon movement of the piston element and the other of the means mounted on the cylinder element, movement of the one means in dependence on the movement of the piston element in direction towards and away from the sensor element creating variations of the magnetic field in the region of the sensor means which variations of the magnetic field result in corresponding electric signals furnished by the sensor means.

The circuit of the invention consists essentially of amplifier means for providing a first time delay, and first and second comparators connected to the output of the amplifier means for comparing the output to determine whether the vehicle body must be raised, lowered or left unchanged.

The combination of the shock absorber sensor and circuit consists essentially of a shock absorber having a cylinder element, a piston element movable within the cylinder element, one of these elements secured to the wheel axle and the other of these elements secured to the body of the vehicle, magnet means for producing a steady magnetic field arranged within the cylinder element, and sensor means arranged also within the cylinder element spaced from the magnet means, one of the means mounted for movement in dependence upon movement of the piston element and the other of the means mounted on the cylinder element, movement of one means in dependence upon movement of the piston element in directions towards and away from the sensor element creating variations of the magnetic field in the region of the sensor means, which variations of the magnetic field result in corresponding electric signals furnished by the sensor means, amplifier means connected to receive the signals as input, the amplifier means providing a first time delay, and first and second comparators connected to the output of the amplifier means for comparing the output to determine whether the vehicle body must be raised, lowered, or left unchanged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
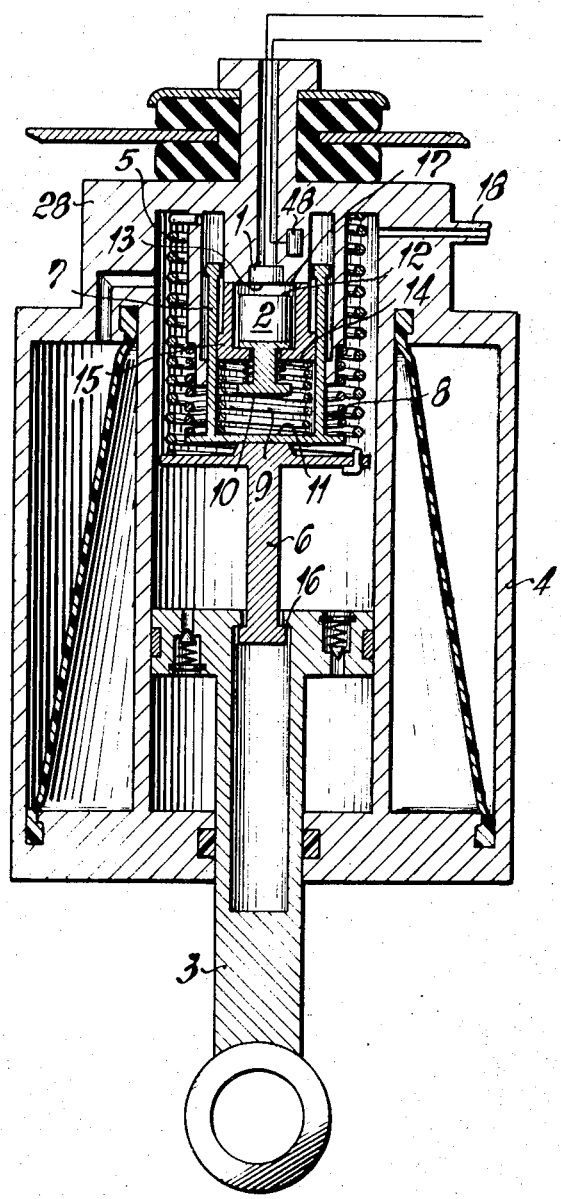
FIGS. 1 and 2 are longitudinal views in cross-section of the different embodiments of the invention.

With reference to FIG. 1, a field plate 1 serves as the transducer. As is known, a field plate is a magnetically controlled resistor. The resistance value R of the field plate used in the invention varies, with respect to the value $R_O$ outside of a magnetic field, as the cube of the magnetic flux, if the flux is less than 3,000 Gauss. The field plate forms part of control means according to the invention.

With stronger magnetic fields, the change in resistance gradually becomes directly proportional to the magnetic flux. In a field of 10,000 Gauss, the resistance is 18 times its value of $R_O$. The maximum temperature coefficient for the material of which the field plate is made is approximately — 3%/° C. When the field plate is used in a shock absorber, the field plate, because of its high temperature coefficient, must be temperature compensated.

Positioned opposite the field plate is a movable permanent magnet, the spacing a between the two varying in dependence on the movement of the wheel axle, as will be explained. The resistance of the field plate 1 increases or decreases depending upon whether the permanent magnet moves towards or away from the field plate, thereby increasing or decreasing the strength of the magnetic field surrounding the latter.

In FIG. 1, the arrangement of the invention is shown in its normal position, which is that range within which there is no correction of the height of the vehicle body with respect to the wheel axle. In the normal position, the permanent magnet 2 is at a distance A from the field plate 1, the latter having a resistance $R_N$.

The vehicle body must be raised when the rod 3 moves out of the normal position and farther into the cylinder 4. In this event, the tension spring 5 pulls the rod 6 against the bottom of the sleeve 7, which latter is moved upward against the bias of the compression springs 8 and 9.

Until the faces 10 and 11 contact each other, the spacing between the permanent magnet 2 and the field plate 1 remains a (normal position), this spacing a being equal to the spacing between the two faces 12 and 13. As the piston rod 3 rises higher into the cylinder 4, the magnet 2 is moved upward in the magnet holder 15, against the force of the compression spring 14, until it contacts the field plate 1, the resistance of the latter becoming $R_R$. When the magnet 2 and the field plate 1 are in contact, the tension spring 5 is at its shortest, and the rod 6 is stationary. With further upward movement of the piston rod 3, the neck 16 of the rod 3 frees itself from the shoulder of the rod 6.

If the piston rod 3 now begins to descend in the cylinder 4, the neck 16 engages the shoulder of the rod 6, pulling the latter down. The compression springs 8, 9 and 14 relax, the spring 14 drawing the magnet 2 down to its lowermost position in the carrier 15. The spacing a (normal position) is retained until the descending sleeve 7 catches the shoulder of carrier 15, whereupon the spacing between the magnet 2 and field plate 1 is increased by an amount equal to the spacing between the faces 13 and 17, the latter face being the rim face of the carrier 15.

In this position, the resistance of the field plate 1 is reduced to $R_L$. Once the sleeve 7 is engaged by a stationary part of the vehicle body, any further downward movement of the piston rod 3 and the rod 6 does not affect the resistance of the field plate 1. The spacing between the faces 12, 17 and 17, 13 remains unchanged.

The resistance of the field plate changes by a factor of 2 when the magnet moves from one position to another. The three different resistance values of the field plate 1 are used in an electric control circuit to cause hydraulic fluid, through the line 18, to be supplied, if the body must be raised, withdrawn, if the body must be lowered, or to cause the closing of all valves, if the body is in the correct position with respect to the wheel axle.

The strength of the magnetic field surrounding the field plate 1 depends upon the spacing between the latter and the permanent magnet 2. If the spacing between the faces 12 and 13 is equal to a the line 18 is closed; if the spacing between the faces 12 and 13 is equal to zero, hydraulic fluid is supplied through the line 18 to the cylinder 4; if the spacing between the faces 12 and 13 is great compared to the spacing a, hydraulic fluid is withdrawn from the cylinder 4 through the line 18.

Figure 2:
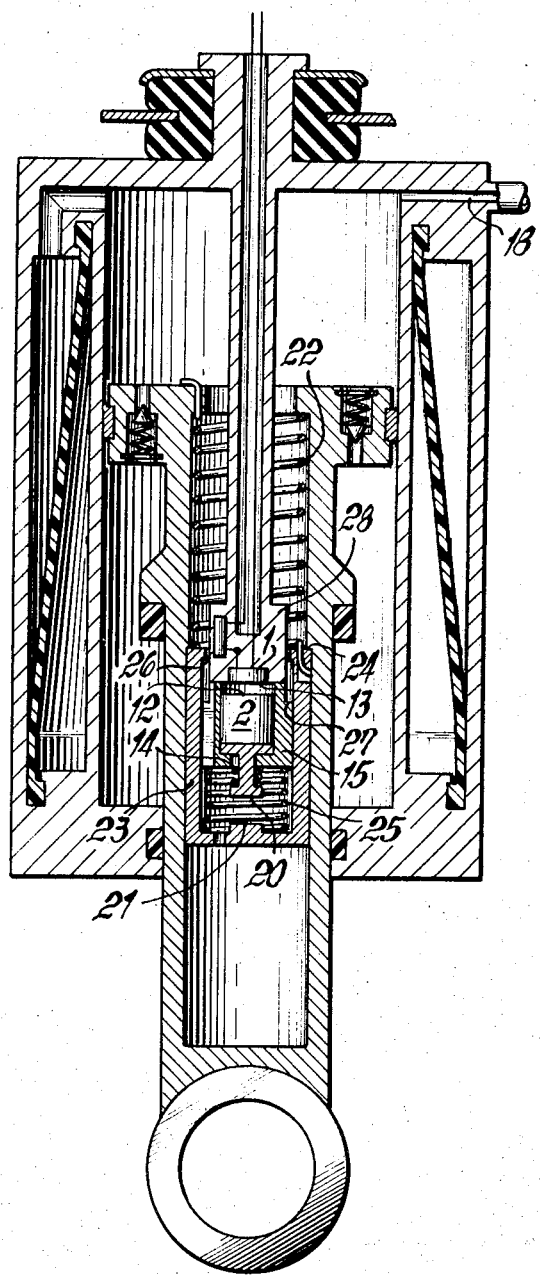

The embodiment shown in FIG. 2 is particularly advantageous with shock absorbers having a short housing but a long stroke, so that the arrangement of the permanent magnet, field plate, springs, magnet housing, and sleeve — which constitute a level switch — cannot be located opposite the upper end of the piston rod. The arrangement of the field plate with respect to the magnet corresponds to that shown in FIG. 1. As in the previous embodiment, the respective faces 12 and 13 of the permanent magnet 2 and the field plate 1 are separated a distance a when the vehicle body is at the desired height above the wheel axle. This normal position of the permanent magnet is shown in FIG. 2. If the piston rod 19, which is hollow, rises higher into the cylinder, the face 21 approaches the face 20, since the tension spring 22 holds the control sleeve 23 against the shoulder 24 of the piston rod 19, the compression spring 25 being squeezed together. The spacing a between the faces 12 and 13 remains unchanged until the face 21 pushes against the face 20. Further upward movement of the piston rod 19 compresses the spring 14, the face 12 approaching the face 13 until the former presses against the latter, whereupon hydraulic fluid is supplied to the cylinder through the line 18. If the piston rod 19 continues to rise, the control sleeve 23 frees itself from the shoulder 24 of the piston rod 19, thereby stretching the tension spring 22.

If the piston rod 19 descends from the position shown in FIG. 2, the face 26 of the control sleeve 23 approaches the face 27 of the magnet carrier 15. Until these faces come into contact, the compression spring 25 holds the upper face of the magnet carrier 15 against the lower face of the field plate carrier 28. The spacing a between the faces 12 and 13 remains unchanged. If the piston rod 19 descends farther, the face 26 engages the magnet carrier 15, forcing the latter downward and increasing the space between the faces 12 and 13, whereupon hydraulic fluid is withdrawn through the line 18 from the cylinder.

The chief advantages of the control means comprising a field plate lie in its small size, and that it lends itself to switching without contacts and to use in circuitry with simple sequential switching. The field plate, moreover, is insensitive to shock and acceleration, and only one field plate is required for the three switching conditions.

Two further embodiments of the invention will be described, one employing reed contacts and the other a magnetic switch.

Figure 3:
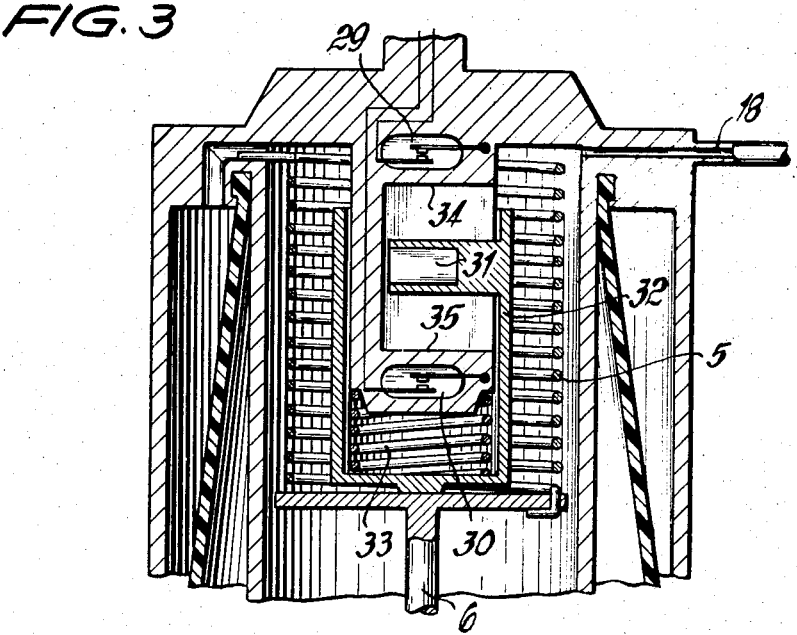
FIGS. 3 and 4 are partial longitudinal views in cross-sections of two further embodiments of the invention.

Reed contacts are magnetically actuated switches the contacts being opened or closed depending upon the strength of the magnetic field. In the embodiment shown in FIG. 3, the construction of the shock absorber, with the rod 6 and the tension spring 5, is similar to the embodiment shown in FIG. 1. The control means comprising a field plate is replaced by control means comprising two reed switches 29 and 30 which are arranged in the cylinder of the shock absorber, there being located between these two switches a permanent magnet 31, which is held in a carrier 32 that is free to move along the axis of the shock absorber, so that the strength of the magnetic field surrounding each of the read switches is varied. A compression spring 33 is squeezed between the magnet 32 and the lower end of that part of the cylinder carrying the reed switches 29 and 30.

When the piston rod (not shown) rises in the cylinder, the tension spring 5 draws the rod 6 and the magnet carrier 32 against the compression spring 33 and in the direction of the reed switch 29, which closes when the magnet 31 touches the face 34, causing hydraulic fluid to be supplied to the cylinder through the line 18.

In the normal position, the permanent magnet 31 is approximately midway between the reed switches 29 and 30. Both switches remain open. When the piston rod descends, the rod 6 is drawn down. The compression spring 33 relaxes, so that the permanent magnet is free to move downward until it comes to rest on the surface 35, the switch 30 closing. Electric leads are connected to the reeds of the switches 29 and 30.

The chief advantages of the reed switches are that the contacts are located in a protective gas, and that the switch is small in size and automatically operated. Moreover the reed switches can be directly connected to relays to operate the latter.

Figure 4:
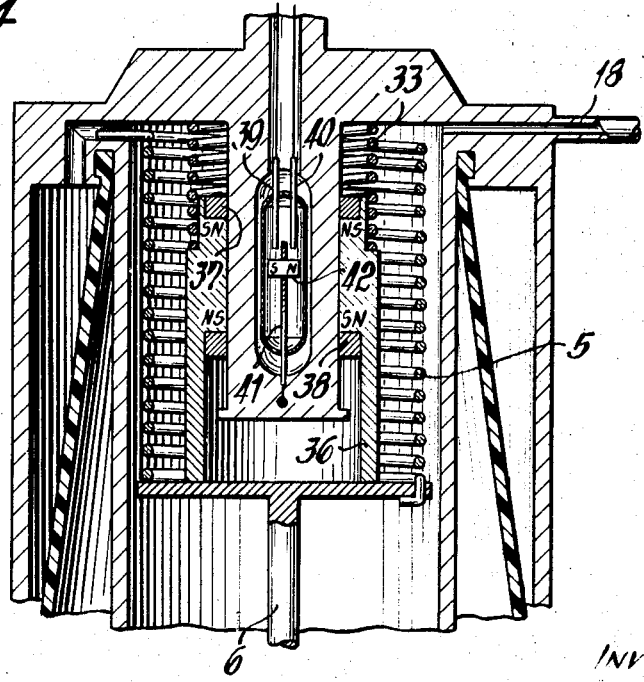

FIG. 4 shows an embodiment of the invention employing control means comprising a two-way magnetic switch. In this embodiment, as in the previous ones, the rod 6 controls the position of a magnet carrier 36, which holds two radially magnetized ring magnets 37 and 38 of opposite polarity. Two stationary vanes 39 and 40 are held in a part of the cylinder, between these two vanes there being positioned a leaf spring contact vane 41, which is held at its lower end and is provided with a small bar magnet 42.

The two-way magnetic switch operates in dependence on the position of the magnet carrier 36 with respect to the bar magnet 42. When the shock absorber must be supplied with hydraulic fluid, the bar magnet 42 is acted upon by the field of the ring magnet 38, the magnet 42 being moved to the right, causing the contact vane 41 to touch the vane 40. When the two ring magnets 37 and 38 are equi-distantly spaced from the bar magnet 42, the leaf spring contact vane assumes a central position between the two vanes 39 and 40, in consequence of the return force of the spring vane 41. When hydraulic fluid must be withdrawn from the cylinder, the magnetic field of the ring magnet 37 acts upon the bar magnet 42, drawing the latter to the left to make contact between the vanes 39 and 41. The leaf spring contact 41, as well as the vanes 39 and 40, are connected to electric leads.

The chief advantages of the control means comprising a two way magnetic switch are that a single transducer is required for the three switching conditions, that the contacts are positioned in a protective atmosphere, that the switch is automatically operated, and that it can be directly connected to relays for operating the latter.

If it is desired to avoid tipping of the vehicle body, caused, for example, by a slanting or shifted load, there must be provided two shock absorbers of the kind previously described, one at each end of the wheel axle. This arrangement also avoids raising the vehicle body when the latter momentarily tips, under the influence of centrifugal force while rounding a curve.

A quick adjustment of the body height during loading and unloading, or in response to temperature changes, is obtained by connecting the arrangement of the invention to quick acting switches for controlling the flow of hydraulic fluid to and from the line 18. In order to prevent the hydraulic fluid in the line 18 from being controlled at the wheel rpm, the electronic control incorporates a time delay, which is somewhat greater than the period of oscillation of the vehicle body.

Figure 5:
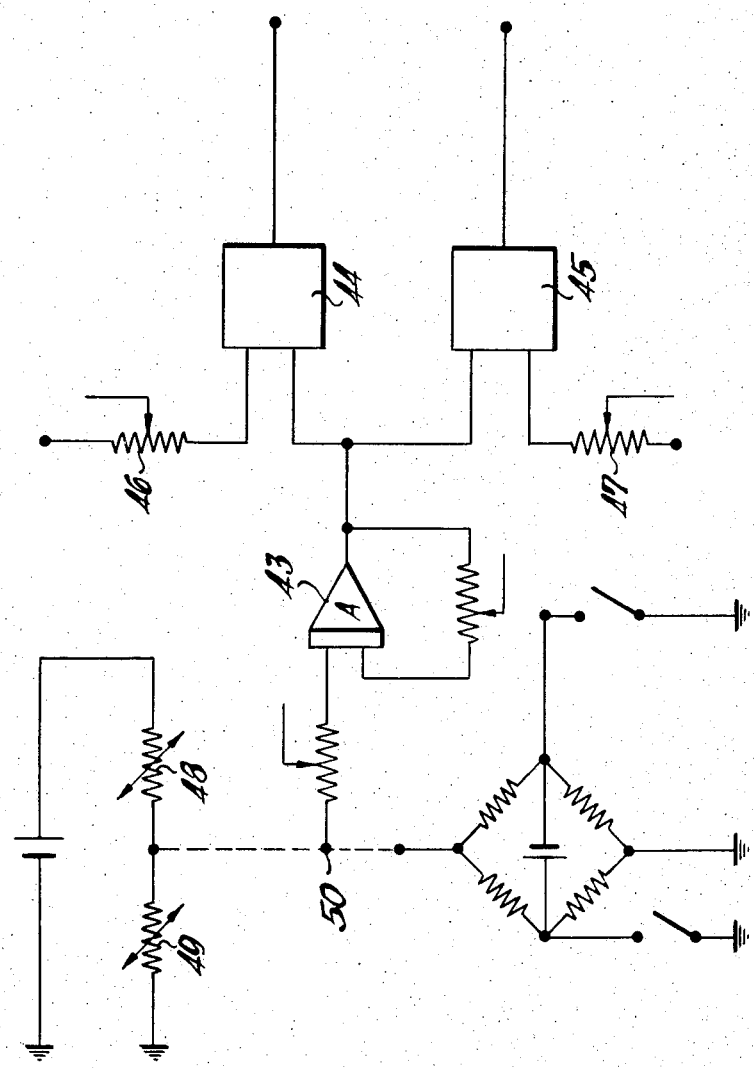
FIG. 5 is a diagram of one circuit of the invention.

FIG. 5 is a schematic diagram of a circuit suitable for use with the arrangement of the invention. The amplifier 43 is designed as a time delay unit of the first order. Its function is $E\text{ out} = E\text{ in}(1 - \exp(-t/RC))$. Connected to the output of the amplifier 43 are two comparators 44 and 45, the function of these comparators being for $E\text{ in}_1 + E\text{ in}_2 > 0 \rightarrow E\text{ out} = 1$;
for $E\text{ in}_1 + E\text{ in}_2 < 0 \rightarrow E\text{ out} = 0$.

The potentiometers 46 and 47 enable adjustment of the switching points $E\text{ in}_1 > E\text{ in}_2$ and $E\text{ in}_1 < E\text{ in}_2$.

Connected to the input of the circuit shown in FIG. 5 are two series connected resistors 48 and 49, which form a voltage divider. The resistor 49 represents the resistance of the field plate 1. The resistor 48, which is also shown in FIG. 1, has the same temperature coefficient as the resistor 49. Changes in the resistance value of the field plate causes changes in the voltage at the junction 50. The resistor 48 can be replaced by a field plate. The two resistors 48 and 49 are closely coupled thermally. If the resistor 48 is also a field plate, it must not be exposed to a magnetic field. Since the two resistors 48 and 49 have the same temperature coefficient, the temperature coefficient of the field plate 49 is compensated. By using the amplifier 43 to change the capacity of the integrating capacitor, the delay time can be varied through a wide range. By adjusting the comparator reference voltages between 0 and the maximum output voltage of the amplifier 43, the relationship of the switch-in delay to the switch-out delay can be varied through a wide range.

Figure 6:
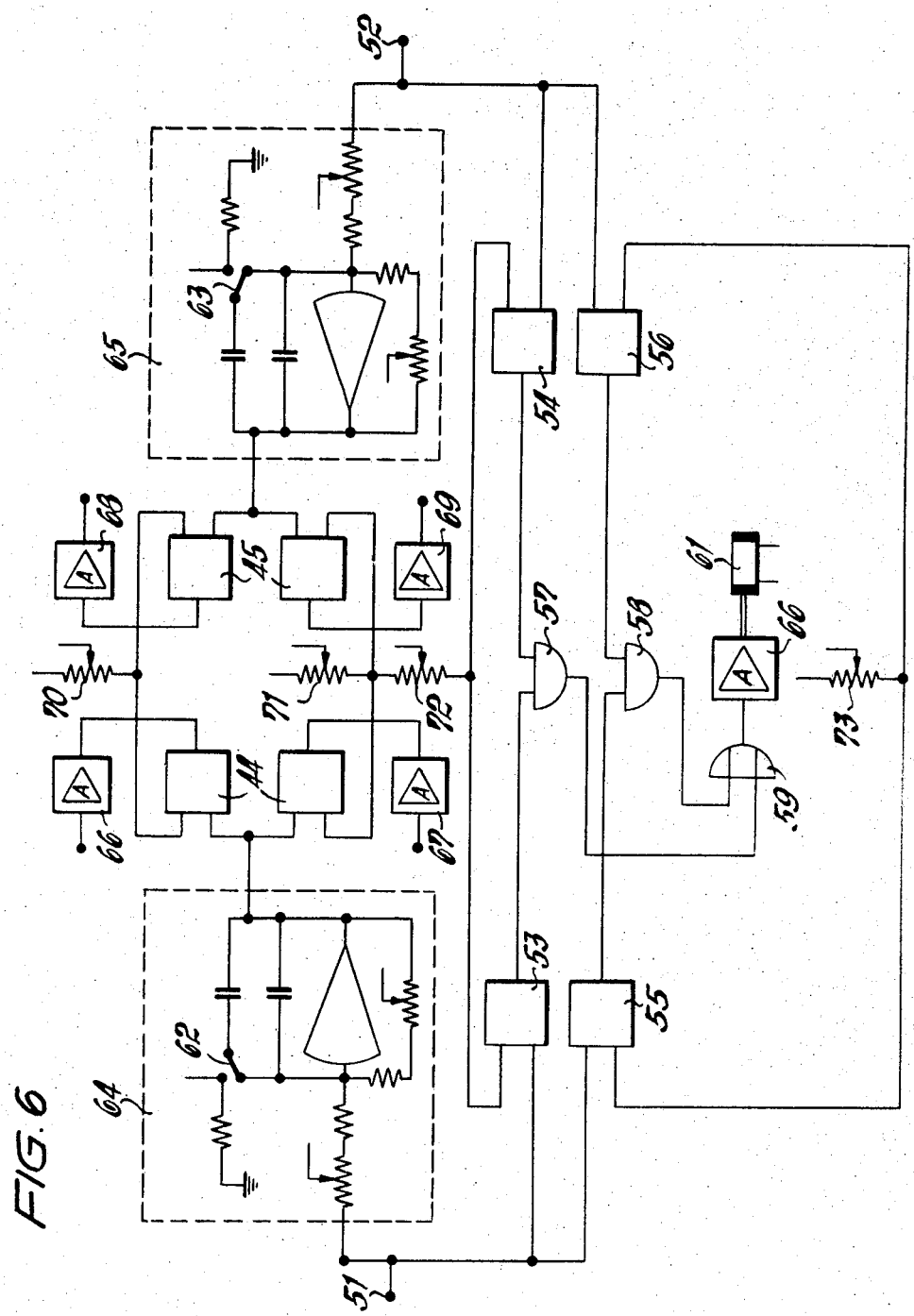
FIG. 6 is a diagram of a second circuit of the invention.

The circuit shown in FIG. 6 incorporates the second time delay, which is substantially greater than the first time delay. Normally, the second time delay is switched in, the first time delay being switched in only when both shock absorbers of a single wheel axle are simultaneously being supplied with hydraulic fluid or hydraulic fluid is simultaneously being withdrawn from the two shock absorbers. The respective left and right inputs, 51 and 52, are connected to the transducers in respective shock absorbers at either end of the wheel axle. Three different possible voltages can be on the inputs 51 and 52, as explained in connection with FIG. 7. The comparators 53 (add fluid left), 54 (add fluid right), 55 (withdraw fluid left), and 56 (withdraw fluid right) control, by means of the AND gate 57 (add fluid) or 58 (withdraw fluid), the OR gate 59, and the switching amplifier 60, the relay 61, so that by operating the switches 62 (left) and 63 (right) there is switched in the shorter time constant of the time delay unit of the first order 64 (left) and 65 (right).

The shorter time delay is switched in only when the shock absorbers of a wheel axle are simultaneously being supplied with hydraulic fluid or hydraulic fluid is simultaneously being withdrawn from both shock absorbers. If this is not the case, the amplifier 60 does not put the relay 61 under voltage, and the switches 62 and 63 remain in the position shown in FIG. 6, the longer time delay remaining switched in. The amplifiers 66, 67, 68 and 69 are so designed that they can directly control the electro-magnetic valve of the entire arrangement. The potentiometers 70, 71, 72 and 73 enable adjustment of the reference voltages of the corresponding comparators for setting the switching points.

Figure 7:
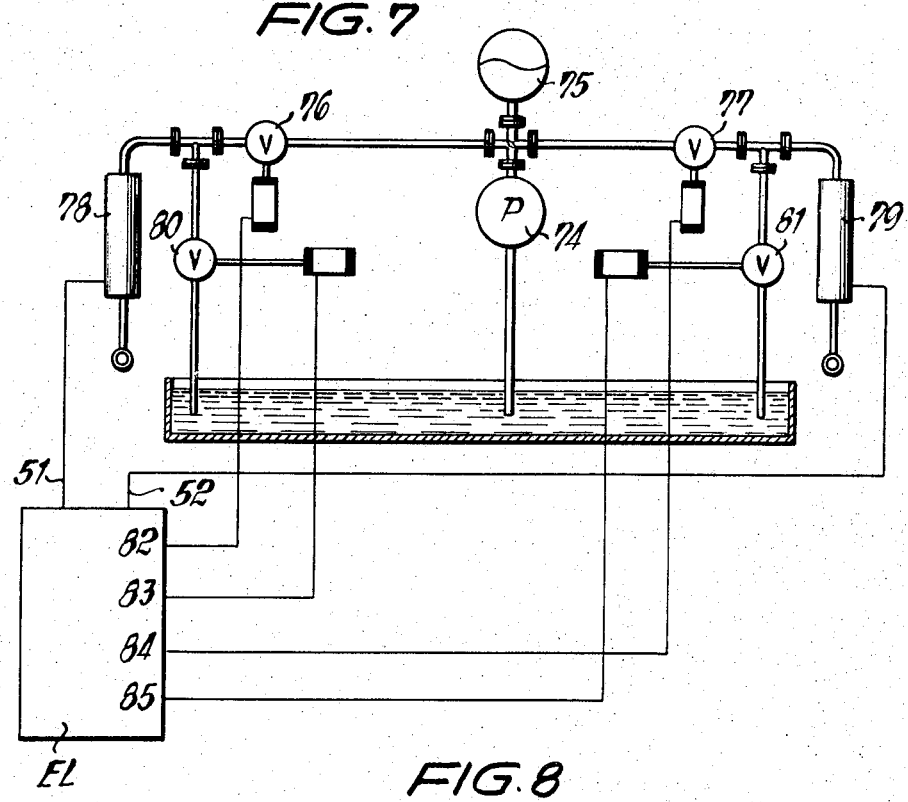
FIGS. 7 and 8 schematically show two hydraulic control arrangements.

FIG. 7 shows an arrangement for controlling the hydraulic lines by means of electromagnetic valves. The pump 74 insures that the pressure in the high pressure reservoir does not fall below a given minimum value. When the valve 76 and/or 77 is opened, hydraulic fluid is supplied to the corresponding shock absorber 78 and/or 79. Hydraulic fluid is withdrawn from the shock absorbers by opening the valve 80 and/or 81. FIG. 7 also shows the connections between the electrical transducers (field plates, reed switches, or the two-way magnetic switch) and the electronic circuit EL, as well as the control lines connected between the outputs of the amplifiers, 82, 83, 84 and 85, and the respective electro-magnetic valves.

A high pressure reservoir 75 is advantageous, even though, the full load adjustment of the shock absorbers rarely occurs because the hydraulic regulation should be quick.

Figure 8:
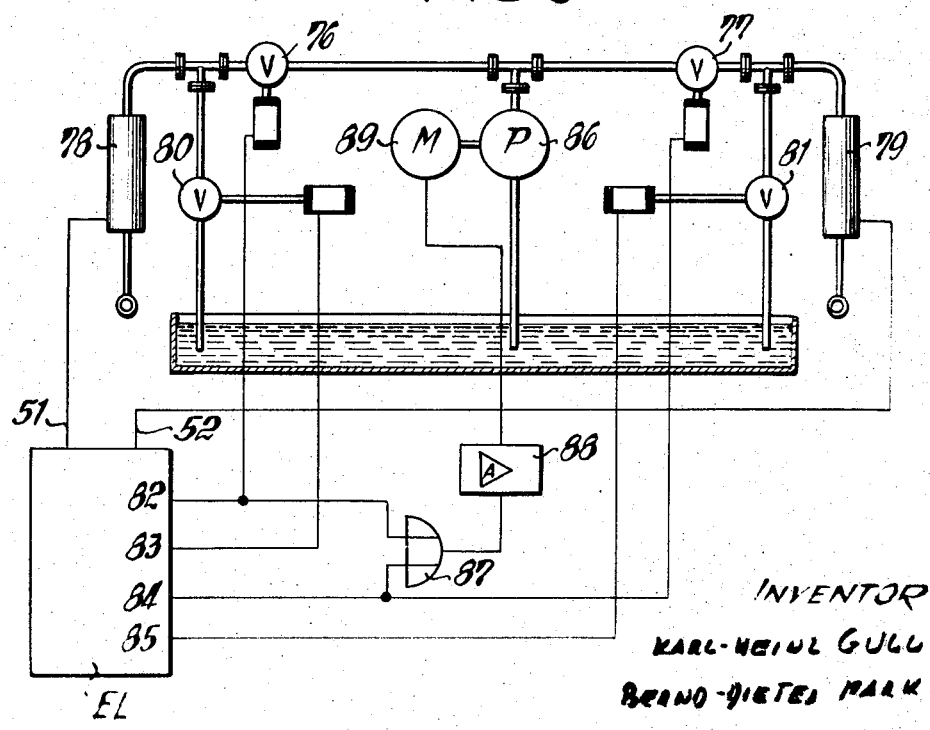

FIG. 8 shows an arrangement having no high pressure reservoir. A relatively large pump 86 is essential if full use is to be made of the advantages offered by the electronic circuit. This pump must supply hydraulic fluid when at least one of the two valves 76 and 77 is open. The electrical connections in the circuit are made by the gate 87 and the amplifier 88, which latter controls the pump motor 89.

As the foregoing makes clear, the invention provides adjustment of the body height with respect to the wheel axle for different loadings of the body, by using a hydropneumatic or pneumatic springing system, which offers substantial advantages, among them being adjustable time delay as against a purely hydraulic regulation, a smaller level switch, the avoidance of a separate level sensor, which reduces the number of additional suspension points on the vehicle, and the possibility of adjusting the body height at each wheel.

It will be understood that each of the elements described above, or two or more together, may also find a useful application in other types of constructions and circuits, differing from the types described above.

While the invention has been illustrated and described as embodied in an arrangement for sensing and correcting the level of a body, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

We claim:

1. In a fluid-tight shock absorber for leveling the height of a vehicle body with respect to the wheel axle, in combination, a cylinder unit; a piston unit, one of said units being connectable with the wheel axle and the other of said units being connectable with the body of the vehicle, and one of said units being movable with respect to the other of said units; magnet means for producing a steady magnetic field; and control means responsive to the strength of the magnetic field produced by said magnet means, one of said means being mounted for movement with respect to the other of said means in dependence upon movement of one of said units with respect to the other of said units, whereby to provide for the generation by said control means of control signals.

2. In a body leveler as defined in claim 1, wherein said magnet means and control means respectively comprise a permanent magnet and a field plate, and further including first carrier means for holding said field plate; and second carrier means having a cavity for holding said permanent magnet, said cavity being deeper than said permanent magnet, said permanent magnet being movable within said cavity and said second carrier means being movable along a direction in dependence on movement of said piston element so that said permanent magnet with respect to said field plate can take a first normal position separated from said field plate by the difference between the cavity depth and the depth of said permanent magnet, a second position having a minimum separation from said field plate, and a third position having a separation from said field plate equal to that of said first position plus the distance between said first and second carrier means, said first, second, and third positions being respectively associated with the normal body position, too low body position, and too high body position, with respect to the wheel axle.

3. In a body leveler as defined in claim 2, further including first compression spring means for seating and holding said permanent magnet in said cavity; sleeve means surrounding said second carrier means and movable with respect thereto along said direction; second compression spring means compressed between said sleeve means and said second carrier means; and tension spring means and rod means cooperating to urge said sleeve means in direction of said first carrier means when said piston means is in a position to cause said permanent magnet to be in said first or second position, said rod means contacting said sleeve means in said first and second positions of said permanent magnet, whereby said second compression spring means urges said second carrier means toward said first carrier means.

4. In a body leveler as defined in claim 3, wherein in said second position said second carrier means and said permanent magnet are in contact with said first carrier means under the urging of said tension spring means, rod means, and sleeve means.

5. In a body leveler as defined in claim 3, further including means coupling together said piston unit and said rod means, when movement of the former causes said permanent magnet to move towards said third position, for removing the contact between said sleeve means and said rod means; and third compression spring means for urging said second carrier means away from said first carrier means, said second compression spring means also urging said second carrier means away from said first carrier means when the contact between said sleeve means and said rod means is removed.

6. In a body leveler as defined in claim 2, further including a temperature compensating resistor connected in series with said field plate.

7. In a body leveler as defined in claim 2, wherein said piston unit is hollow and said field plate, permanent magnet, first carrier means, and second carrier means are located within the hollow of said piston unit, and further including a control sleeve movable along said direction within the hollow of said piston unit and surrounding said second carrier means to permit relative movement along said direction between said control sleeve and said second carrier means; a shoulder comprised by the hollow of said piston unit; and tension spring means for urging said control sleeve against said shoulder.

8. In a body leveler as defined in claim 1, wherein said control means comprise first and second magnetically operated, spaced, stationary, reed switches, and said magnet means moves between said reed switches in dependence upon movement of said piston unit so that the spacing between said magnet means and each of said reed switches varies to operate each of said reed switches, and further including stationary first carrier means for holding said first and second reed switches.

9. In a body leveler as defined in claim 8, wherein said magnet means with respect to said first and second reed switches can take a first position approximately midway between said first and second reed switches, a second position nearer to said first reed switch than to said second reed switch, and a third position nearer to said second reed switch than to said first reed switch, said first, second, and third positions being respectively associated with the normal body position, too low body position, and too high body position, with respect to the wheel axle, and further including second carrier means for holding said magnet means, said second carrier means being movable in a direction parallel to the axis of said cylinder unit; compression spring means compressed between said first and second carrier means for urging said second carrier means in the direction of said second reed switch; and tension spring means for urging said second carrier means in the direction of said first reed switch.

10. In a body leveler as defined in claim 1, wherein said magnet means comprises first and second radially magnetized ring magnets spaced along the axis of said cylinder unit, said sensor means includes first and second vanes spaced along a diameter of said cylinder element, a contact vane spaced centrally between said first and second vanes and movable therebetween, and a permanent magnet carried by said contact vane, and further including stationary first carrier means for holding said sensor means; second carrier means for holding said first and second ring magnets, said second carrier means being movable in a direction parallel to the axis of said cylinder unit in response to movement of said piston unit so that said first and second ring magnets can take a first position in which said first and second ring magnets are approximately equally spaced from said permanent magnet, a second position in which said second ring magnet is nearer to said permanent magnet than said first ring magnet is to cause deflection of said contact vane in one direction to contact said second vane, and a third position in which said first ring magnet is nearer to said permanent magnet than is said second ring magnet to cause deflection of said contact vane in the other direction to contact said first vane, said first, second and third positions, respectively being associated with normal, too low, and too high body positions, with respect to the wheel axle; tension spring means for biasing said second carrier means so that said second ring magnet is urged nearer to said permanent magnet; and compression spring means compressed between said second carrier means and said cylinder unit for biasing said second carrier means so that said first ring magnet is urged nearer to said permanent magnet.

11. A body leveler as defined in claim 10, wherein said ring magnets are of opposite polarity.

12. A circuit for processing signals from a shock absorber height sensor for leveling the height of a vehicle body with respect to the wheel axle, comprising, in combination, amplifier means for providing a first time delay; and first and second comparator means connected to the output of said amplifier for comparing the output to determine whether the vehicle body must be raised, lowered, or left unchanged.

13. A circuit as defined in claim 12, there being a shock absorber at each end of the wheel axle, further including delay means for producing a second time delay different from said first time delay, and means for introducing said second time delay in dependence on the signals from the two shock absorbers.

14. A circuit as defined in claim 13, wherein said first time delay is shorter than said second time delay, said first time delay being longer than the maximum possible period of oscillation of the vehicle body, and further including means for introducing said first time delay when the signals from the two shock absorbers are the same.

15. A circuit as defined in claim 13, wherein said second time delay is sufficiently long so that no leveling takes place while the vehicle rounds a curve and the body tips due to centrifugal force, and further including means for introducing said second time delay when the signals from the two shock absorbers are different.

16. A circuit as claimed in claim 13, including means for introducing either said first or said second time delay, said first time delay being introduced only when the signals from both of the shock absorbers are the same.

17. A circuit as defined in claim 14, wherein said means include a relay, an amplifier connected to said relay, an OR gate connected to the input of said amplifier, and two AND gates connected to the respective inputs of said OR gate.

18. A circuit as defined in claim 17, further including a pump for supplying hydraulic fluid to the shock absorber; means for causing operation of said pump each time that fluid must be supplied to at least one of the shock absorbers; and valve means connected between said pump and each of said shock absorbers.

19. An arrangement for leveling the height of a vehicle body with respect to the wheel axle, comprising, in combination, a shock absorber having a cylinder unit; a piston unit, one of said units being connectable with the wheel axle and the other of said units being connectable with the body of the vehicle, and one of said units being movable with respect to the other of said units; magnet means for producing a steady magnetic field; control means responsive to the strength of the magnetic field produced by said magnet means, one of said means being mounted for movement with respect to the other of said means in dependence upon movement of one of said units with respect to the other of said units, and relative movement between said means causing variations in the magnetic field in the region of said control means, which variations of said magnetic field result in furnishing of corresponding electric signals by said control means; amplifier means connected to receive said signals, said amplifier means producing a first time delay; and first and second comparators connected to the output of said amplifier means for comparing the output to determine whether the vehicle body must be raised, lowered, or left unchanged.

20. An arrangement as defined in claim 19, there being a shock absorber at each end of the wheel axle, further including delay means for producing a second time delay different from said first time delay, and means for introducing said second time delay in dependence on the signals from the two shock absorbers.

21. An arrangement as defined in claim 20, wherein said first time delay is shorter than said second time delay, said first time delay being longer than the maximum possible period of oscillation of the vehicle body, and further including means for introducing said first time delay when the signals from the two shock absorbers are the same.

22. An arrangement as defined in claim 20, wherein said second time delay is sufficiently long so that no leveling takes place while the vehicle rounds a curve and the body tips due to centrifugal force, and further including means for introducing said second time delay when the signals from the two shock absorbers are different.

23. An arrangement as defined in claim 20, including means for introducing either said first or said second time delay, said first time delay being introduced only when the signals from both of the shock absorbers are the same.

24. An arrangement as defined in claim 21, wherein said means includes a relay, an amplifier connected to said relay, and OR gate connected to the output of said amplifier, and two AND gates connected to the respective inputs of said OR gates.

25. An arrangement as defined in claim 24, further including a pump for supplying hydraulic fluid to the shock absorbers; means for causing operation of said pump each time that fluid must be supplied to at least one of the shock absorbers; and valve means connected between said pump and each of the shock absorbers.

* * * * *